(12) United States Patent
Voegeli, Jr.

(10) Patent No.: US 7,434,786 B2
(45) Date of Patent: Oct. 14, 2008

(54) TIRE CARRIER DISK CLUTCH WITH POSITIVE CLIP RETENTION

(75) Inventor: Anthony P. Voegeli, Jr., Fort Wayne, IN (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 25 days.

(21) Appl. No.: 11/369,140

(22) Filed: Mar. 6, 2006

(65) Prior Publication Data
US 2007/0207863 A1    Sep. 6, 2007

(51) Int. Cl.
*B66D 1/00* (2006.01)
(52) U.S. Cl. .......................... 254/323; 464/38
(58) Field of Classification Search ............. 464/37–39, 464/45; 254/323
See application file for complete search history.

(56) References Cited
U.S. PATENT DOCUMENTS

| | | | |
|---|---|---|---|
| 3,134,997 A * | 6/1964 | Walker | ..................... 464/38 X |
| 6,082,515 A * | 7/2000 | Oono et al. | |
| 2006/0225518 A1 * | 10/2006 | McDonald et al. | |

\* cited by examiner

*Primary Examiner*—Greg Binda
(74) *Attorney, Agent, or Firm*—Richard M. Mescher; Porter, Wright, Morris; Dean B. Watson

(57) ABSTRACT

A torque limiting clutch includes a drive shaft having central rotational axis and a groove, a spring member secured to the drive shaft for rotation with the drive shaft about the central rotational axis, a plate adjacent the spring member and rotatable about the drive shaft, and a retaining clip located within the groove of the drive shaft and engaging the plate to retain the plate on the drive shaft. The plate has a pocket forming an axial-facing first abutment engaging the retaining clip and a radial-facing second abutment located outward of the retaining clip to prevent release of the retaining clip from the groove.

20 Claims, 4 Drawing Sheets

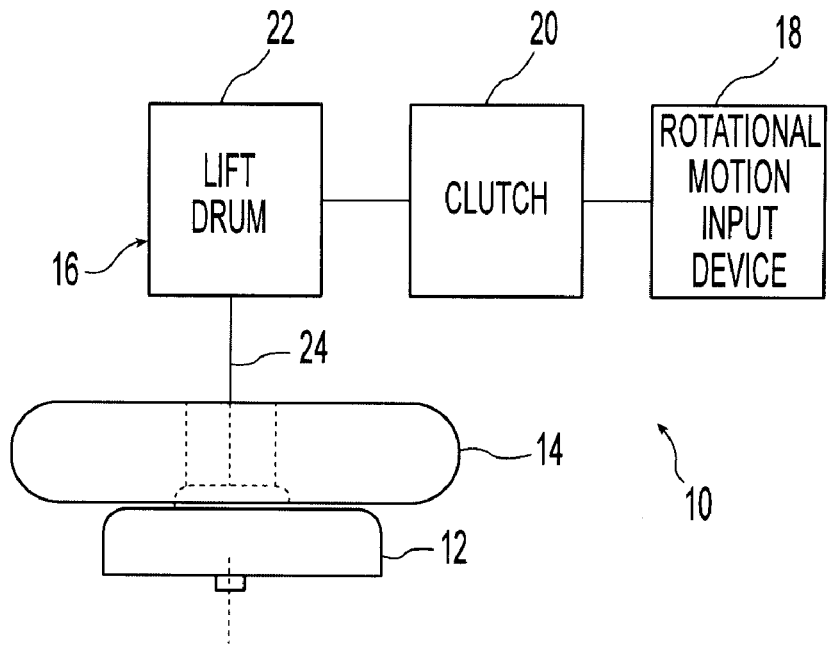
Fig. 1
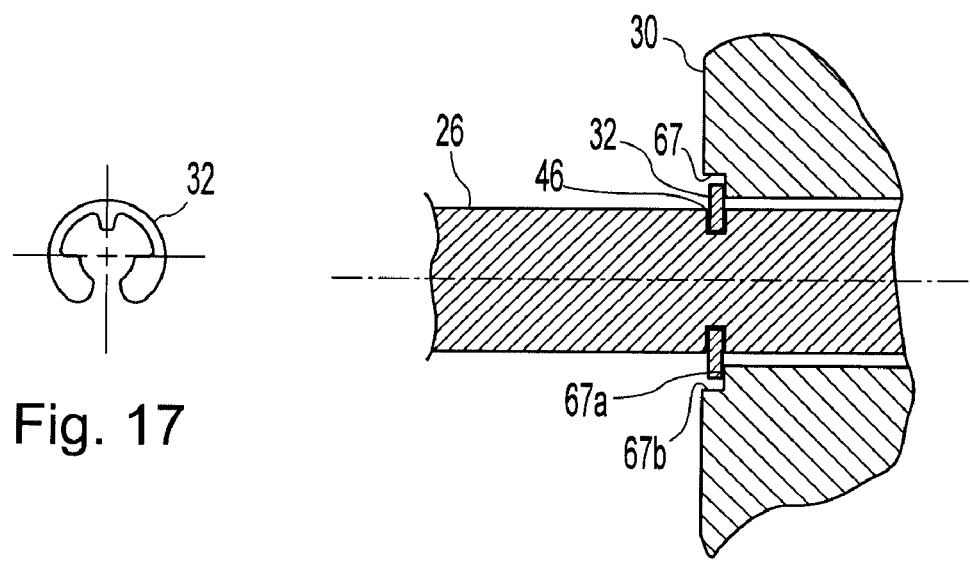
Fig. 17
Fig. 18

TIRE CARRIER DISK CLUTCH WITH POSITIVE CLIP RETENTION

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a torque-limiting disk clutch and, more particularly, relates to a disk clutch for a tire carrier of a motor vehicle.

BACKGROUND OF THE INVENTION

Motor vehicles with inflatable tires such as cars, vans, sport utility vehicles, cross over vehicles, light and heavy duty trucks, tractor trailers, buses, commercial delivery vehicles, among other motorized forms of motorized transportation and trailers pulled by such vehicle are conventionally equipped with spare tires. Some spare tires are stored under the vehicle using a tire carrier which includes a tire winch for raising and lowering the spare tire between a raised or stored position and a lowered or accessed position. The winch typically raises and lowers the spare tire using a flexible member such as a cable or cord which is wound and unwound on a lift drum or reel.

Such tire carriers have been subject to failure due to over loading. When the winch is used to raise a tire from the lowered position to the raised position, the user is unable to determine when the tire is properly stored in the raised position. Thus, in order to make sure the tire is properly raised, there is a tendency for the user to continue to exert torque on the lift drum in an attempt to further wind the cable about the drum. This exerts ever-increasing tension on the cable and may cause it to break, resulting in failure of the tire carrier and the tire dropping to the ground.

Torque limiting clutches have been used to prevent rotation of the lift drum once a predetermined maximum stress has been placed on the cable. After the maximum stress has been reached, application of additional torque results in the clutch overrunning to prevent additional tension from being placed on the cable. Disk-type clutches have been found to be very advantageous due to the resulting reduced package size. However, while such disk clutches effectively reduce the number of tire carrier failures and provide a reduced package size, the prior clutches have retaining clips that sporadically fall off. Accordingly, there is a need in the art for an improved disk clutch for a tire carrier.

SUMMARY OF THE INVENTION

The present invention provides a disk clutch for a tire carrier of a motor vehicle which overcomes at least some of the above-noted problems of the related art. According to the present invention, a torque limiting clutch for a spare tire carrier comprises, in combination, a drive shaft having central rotational axis and a groove, a spring member secured to the drive shaft for rotation with the drive shaft about the central rotational axis, a plate adjacent the spring member and rotatable about the drive shaft, and a retaining clip located within the groove of the drive shaft and engaging the plate to retain the plate on the drive shaft. A radial-facing abutment is located outward of the retaining clip to prevent release of the retaining clip from the groove.

According to another aspect of the present invention, a torque limiting clutch for a spare tire carrier comprises, in combination, a drive shaft having central rotational axis and a groove, a spring member secured to the drive shaft for rotation with the drive shaft about the central rotational axis, a plate adjacent the spring member and rotatable about the drive shaft, and a retaining clip located within the groove of the drive shaft and engaging the plate to retain the plate on the drive shaft. The plate has a pocket forming a radial-facing abutment located outward of the retaining clip to prevent release of the retaining clip from the groove According to yet another aspect of the present invention, a torque limiting clutch for a spare tire carrier comprises, in combination, a drive shaft having central rotational axis and a groove, a spring member secured to the drive shaft for rotation with the drive shaft about the central rotational axis, a plate adjacent the spring member and rotatable about the drive shaft, and a retaining clip located within the groove of the drive shaft and engaging the plate to retain the plate on the drive shaft. The plate has a pocket forming an axial-facing first abutment engaging the retaining clip and a radial-facing second abutment located outward of the retaining clip to prevent release of the retaining clip from the groove.

From the foregoing disclosure and the following more detailed description of various preferred embodiments it will be apparent to those skilled in the art that the present invention provides a significant advance in the technology and art of disk clutch assemblies. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 1 is a schematic view of a tire carrier assembly for a motor vehicle according to a preferred embodiment of the present invention;

FIG. 17 is an end view of a retaining clip of the disk clutch of FIGS. 2 to 5;

FIG. 18 is an enlarged, fragmented cross-sectional view showing a portion of FIG. 5 in the area of the retaining clip.

Figure 2:
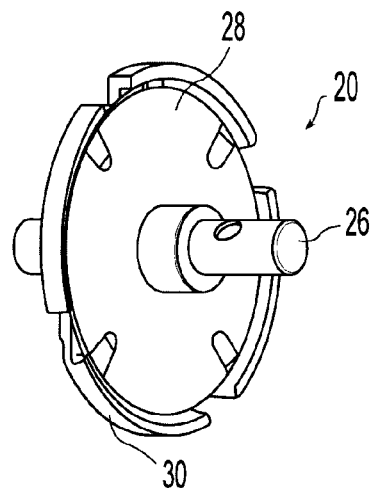
FIG. 2 is a perspective view of a disk clutch of the tire carrier assembly of FIG. 1.
Figure 3:
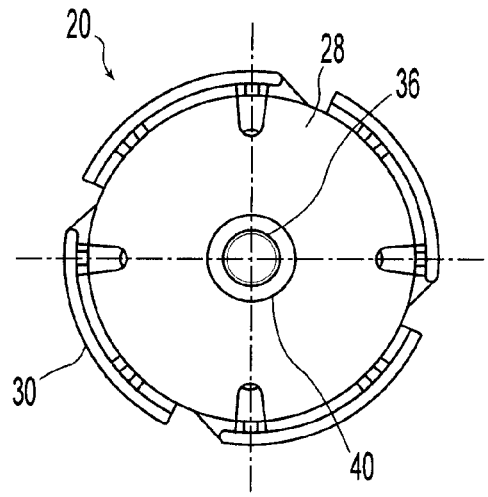
FIG. 3 is an end view of the disk clutch of FIG. 2.
Figure 4:
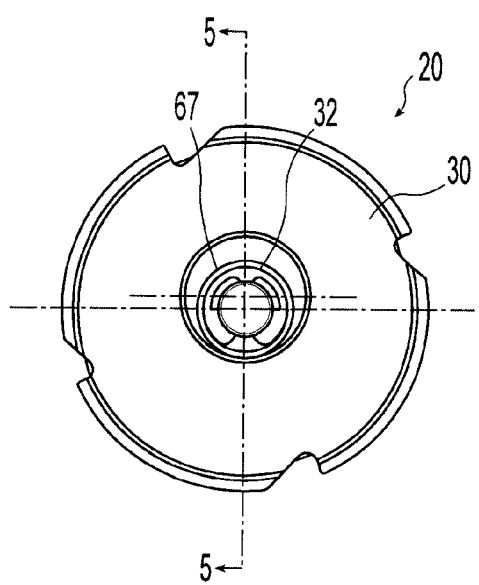
FIG. 4 is an end view of the disk clutch of FIGS. 2 and 3.
Figure 5:
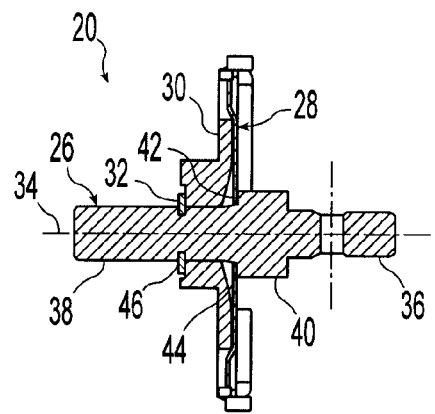
FIG. 5 is a cross-sectional view of the disk clutch taken along line 5-5 of FIG. 4.
Figure 7:
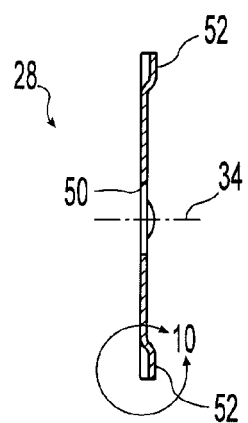
FIG. 7 is a cross-sectional view of the spring member taken along line 7-7 of FIG. 6.
Figure 8:
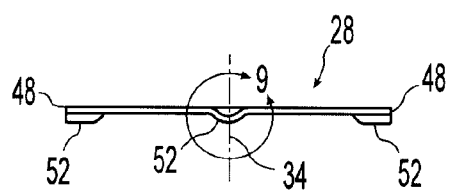
FIG. 8 is a side view of the spring member of FIGS. 6 and 7.

It should be understood that the appended drawings are not necessarily to scale, presenting a somewhat simplified representation of various preferred features illustrative of the basic principles of the invention. The specific design features of disk clutch for a tire carrier as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter lever mechanism illustrated in the drawings. In general, up or upward generally refers to an upward direction within the plane of the paper in FIG. 1 and down or downward generally refers to a downward direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved disk clutch disclosed herein. The following detailed discussion of various alternative and preferred embodiments will illustrate the general principles of the invention with reference to a disk clutch for a tire carrier of a motor vehicle. Other embodiments suitable for other applications will be apparent to those skilled in the art given the benefit of this disclosure.

Referring now to the drawings, FIG. 1 schematically illustrates a spare tire carrier assembly 10 for a motor vehicle according to the present invention. The illustrated tire carrier assembly 10 includes a tire carrier or plate 12 for carrying and supporting a spare tire 14 thereon, a winch assembly 16 for raising and lowering the tire carrier 14 between an upper or storing position and a lower or accessing position, a rotational motion or torque input device 18 for supplying torque to operate the winch assembly 16, and a torque limiting slip mechanism or clutch 20 operatively connecting the torque input device 18 to the winch assembly 16. The winch assembly 16 includes a rotatable lift drum or reel 22 and an elongate flexible member 24 such as a cable, rope, or cord which is wound onto and off of the lift drum 22. It is noted that any suitable winch assembly 16 can be utilized within the scope of the present invention. The flexible member 24 has a first or upper end secured to the lift drum 22 and a second or lower end connected to the tire carrier 12 so that the tire carrier 12 is raised and lowered as the flexible member 24 is wound and unwound on the lift drum 22 respectively.

Figure 6:
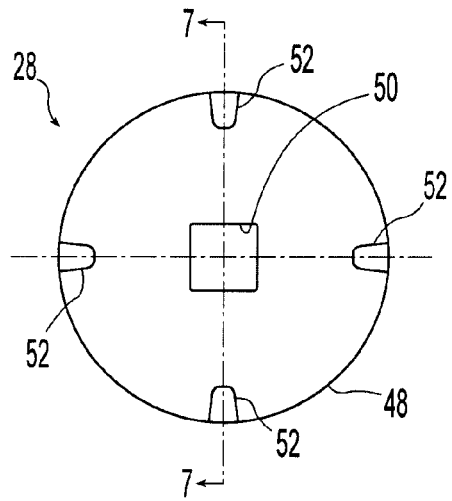
FIG. 6 is an end view of a spring member of the disk clutch of FIGS 2 to 5.
Figure 6A:
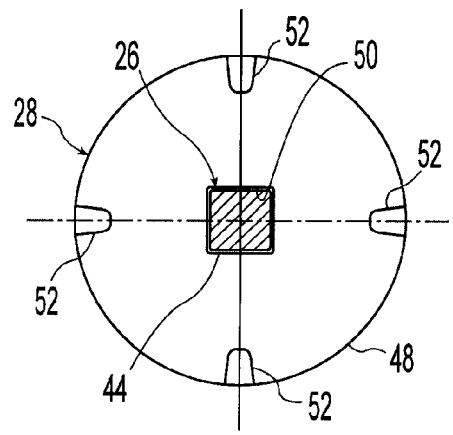
FIG. 6A is an end view similar to FIG. 6 but showing the spring member on a drive shaft with the drive shaft shown in cross-section at the spring member for clarity.
Figure 9:
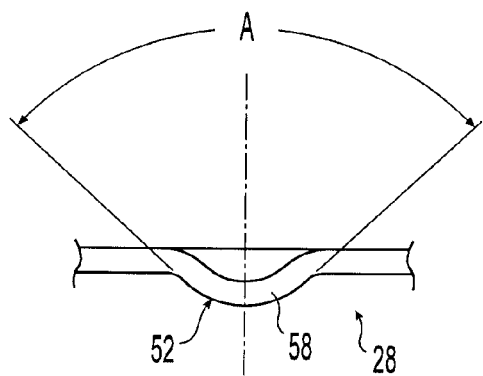
FIG. 9 is an enlarged, fragmented view of a portion of the spring member taken along line 9 of FIG. 8.
Figure 10:
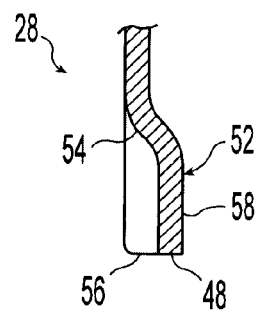
FIG. 10 is an enlarged, fragmented view of a portion of the spring member taken along line 10 of FIG. 9.
Figure 11:
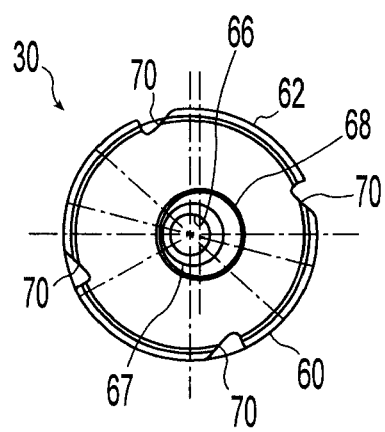
FIG. 11 is an end view of a cam plate of the disk clutch of FIGS. 2 to 5.
Figure 12:
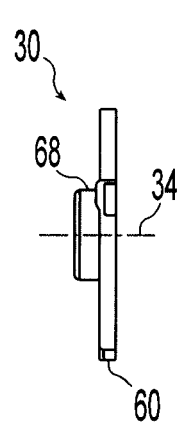
FIG. 12 is a side view of the cam plate of FIG. 11.
Figure 13:
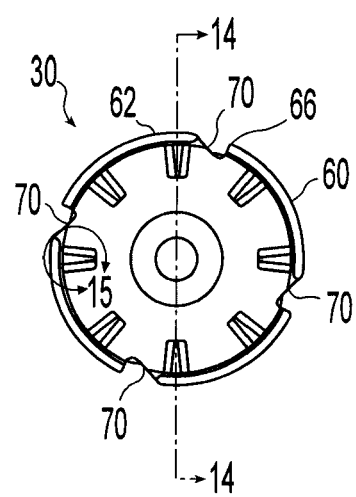
FIG. 13 is an end view of the cam plate of FIGS. 11 and 12.
Figure 14:
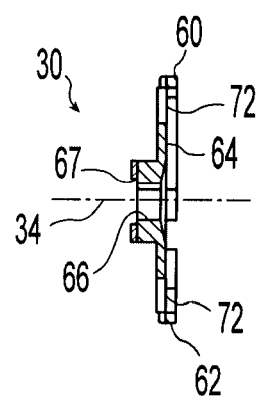
FIG. 14 is a cross-sectional view of the cam plate taken along line 14-14 of FIG. 13.
Figure 15:
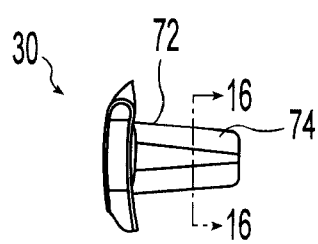
FIG. 15 is an enlarged, fragmented view of a portion of the cam plate taken along line 15 of FIG. 13.
Figure 16:
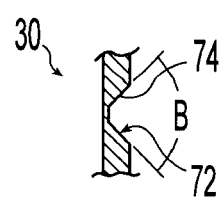
FIG. 16 is a cross-sectional view of the cam plate taken along line 16-16 of FIG. 15.

As best shown in FIGS. 2 to 5, the illustrated clutch 20 includes a drive shaft 26, a spring member 28, a cam plate 30, and a retaining clip or ring 32. The drive shaft 26 defines a central rotational axis 34 for the clutch 20. The illustrated drive shaft 26 includes a first end portion 36 and a second end portion 38 which are separated by an increased diameter or central portion 40 forming an annular-shaped abutment 42 facing the second end portion 38 for engagement by the spring member 28 as described in more detail hereinafter. Each of the illustrated first and second end portions 36, 38 and the central portion 40 are substantially circular in cross-section. Adjacent the abutment 42, however, the illustrated drive shaft 26 is provided with drive portion 44 that is substantially square in cross-section (best shown in FIG. 6A). The drive portion 44 is sized and shaped to cooperate with the spring member 28 to substantially prevent relative rotation and transmit torque therebetween as described in more detail hereinafter. The illustrated drive shaft 26 also includes a groove 46 sized and shaped for receiving the retaining clip 32. The groove 46 is located on the second end portion 38 and spaced from the abutment 42 a distance to obtain a predetermined preload between the spring member 28 and the cam plate 30 as described in more detail hereinafter.

As best shown in FIGS. 6 to 10, the illustrated spring member 28 is generally disk shaped having a circular-shaped outer edge 48. An opening 50 is formed at the central axis 34 of the spring member 28 which is sized and shaped to receive the drive shaft 26. The illustrated opening 50 is substantially square shaped to cooperate with the drive portion 44 of the drive shaft 26. With the drive portion 44 extending into the opening 50, a positive drive is formed between the drive shaft 26 and the spring member 28 so that rotational motion or torque of the drive shaft 26 is transferred from the drive shaft 26 to the spring member 28. It is noted that the spring member 28 can alternatively be secured to the drive shaft 26 in any other suitable manner. The spring member 28 is preferably formed of steel such as, for example, C1075 CRASS but alternatively any other suitable material can be utilized.

The illustrated spring member 28 is provided with a plurality of detents or protrusions 52 extending in an axial direction and located along the outer edge 48 of the spring member 28. The illustrated spring member 28 includes four detents 52 equally spaced about the circumference of the outer edge 48, that is, spaced about 90 degrees apart. It is noted, however, that the spring member 28 can alternatively be provided with any other suitable quantity of detents 52 and can alternatively be located at other suitable positions. The illustrated detents 52 are in the form of bosses formed at the outer edge 48 of the spring member 28. Located at the outer edge 48 assures forming to be more accurate and consistent. The illustrated bosses 52 are formed at the outer edge 48 and extend in the radial direction so that an inner end 54 of the boss 52 is closed while an outer end 56 of the boss 52 is open (best seen in FIG. 10). The illustrated bosses 52 form an engagement surface 58 which is generally V-shaped in cross section. The angle A formed by the engagement surfaces 58 of the bosses 52 is preferably greater than 90 degrees and more preferably about 96 degrees.

As best shown in FIGS. 11 to 16, the illustrated cam plate 30 is generally disk shaped having a circular-shaped outer edge 60. The outer edge 60 is also provided with an axially extending flange 62 to form a cavity 64 for receiving the spring member 28. An opening or passage 66 is formed at the central axis 34 of the cam plate 30 which is sized and shaped to receive the drive shaft 26. The illustrated opening 66 is substantially circular-shaped to cooperate with the second end portion 38 of the drive shaft 26. With the second end portion 38 extending into the opening 66, the drive shaft 26 is rotatable relative to the cam plate 30. Formed in the end face of the cam plate 30 about the opening 66 is a pocket 67 sized and shaped for receiving the retaining clip 32 as described in more detail hereinafter. The illustrated pocket 67 is a circular-shaped counter bore but any other suitable shape can alternatively be utilized. The illustrated pocket 67 forms an axially facing annular shaped first abutment 67a for engagement by the retaining ring 32 as described in more detail hereinafter and a radially inward facing cylindrically-shaped second abutment 67b for preventing undesirable release of the retaining clip 32 from the shaft 26 as described in more detail hereinafter. The illustrated second abutment 32b forms a continuous surface encircling the central axis 34.

The illustrated cam plate 30 also includes an eccentric cam 68 provided about the central axis 34 opposite the cavity 64 and a plurality of cam surfaces or notches 70 equally spaced about the circumference of the outer edge 60. The eccentric cam 68 and the plurality of cam notches 70 are each sized and shaped to cooperate with the lift drum 22 to transmit rotary motion or torque of the cam plate 30 to the drive drum 22. The cam plate 30 is preferably formed of powder metal but alternatively any other suitable material can be utilized.

The illustrated cam plate 30 is provided with a plurality of grooves or pockets 72 within the cavity 64 and located near the outer edge 60 of the cam plate 30. The grooves 72 are positioned, sized and shaped to receive and cooperate with the detents 52 of the spring member 28. The illustrated cam plate 30 includes eight grooves equally spaced about the circumference of the outer edge 60, that is, spaced about 45 degrees apart. It is noted, however, that the cam plate 30 can alternatively be provided with any other suitable quantity of the grooves 72 and the grooves 72 can alternatively be located at other suitable positions. It is noted that the illustrated cam plate 30 is provided with a greater quantity of the grooves 72 than the quantity of the detents 52 of the spring plate 28 to reduce the amount of rotation required by the spring member 28 to reengage the detents 52 with the grooves 72 upon disengagement. The illustrated grooves 72 are formed radially inward of the flange 62 and do not extend through the entire thickness of the cam plate 30 so that they are entirely closed except for a single open side (best seen in FIG. 15) through which the detents 52 enter. It is noted that alternatively other shapes and locations can be utilized such as, for example, the grooves 72 can be open at their bottoms or out ends. The illustrated grooves 72 form an engagement surface 74 which is generally V-shaped in cross section to cooperate with the engagement surfaces 58 of the detents 52. The angle B formed by the engagement surfaces 74 of the grooves 72 is preferably greater than 90 degrees and more preferably about 96 degrees.

As best shown in FIG. 17, the illustrated retaining clip 32 is an E-ring that is an American Standard metric reduced cross section retaining ring external series #CM1-12. The retaining clip 32 can alternatively have any other suitable size and shape. The retaining clip 32 is sized and shaped to cooperate with the groove 46 of the drive shaft 26 to provide an axially-facing abutment for engagement with the first abutment 67a of the cam plate pocket 67 to rotatably secure the cam plate 30 onto the drive shaft 26.

As best shown in FIG. 18, the first abutment 67a of the cam plate pocket 67 engages the retaining clip 32 in the axial direction to retain the cam plate 30 on the drive shaft 26. The second abutment 67b of the cam plate pocket 67 encircles the retaining clip 32. With the second abutment encircling the retaining clip 32, the retaining clip 32 cannot be released from the drive shaft 26 because the retaining clip engages the second abutment 67b to prevent further movement. The pocket 67 is preferably sized so that the retaining clip 32 does not substantially engage the second abutment during normal operation of the clutch 20, but provides positive retention of the retaining clip 32 to the drive shaft 26.

As best shown in FIGS. 2 to 5, the clutch 20 is assembled by inserting the second end portion 38 of the drive shaft 26 into the spring member opening 50 until the spring member 28 engages the abutment 42 and the drive portion 44 of the drive shaft 26 is located within the spring member opening 50. Located in this manner, the spring member 28 is rigidly secured to the drive shaft 26 for rotation therewith. The second end portion 38 of the drive shaft 26 is then inserted into the cam plate opening 66 until the cam plate 30 engages the spring member 28 with the spring member detents 52 located within the cam plate grooves 72. The cam plate 30 is then further moved along the drive shaft 26 by compressing the spring member 28 until the drive shaft groove 46 is exposed. With the groove 46 exposed, the retaining clip 32 is inserted into the drive shaft groove 46 and the cam plate 30 is released so that the spring member 28 axially moves the cam plate into engagement with the retaining clip 32 to retain the cam plate 30 in a desired engagement with the spring member 28. In this position, the retaining clip 32 is located within the pocket 67 of the cam plate 30. When assembled in this manner, rotation of the spring member 28 causes rotation of the cam plate 30 below a predetermined torque limit as the detents 52 engage the grooves 72 to rotate the cam plate 30 with the spring member 28 and the drive shaft 26. However, above the predetermined torque limit, the detents 52 resiliently deflect out of engagement with the grooves 72 so that the spring member 28 rotates with the drive shaft 26 without rotating the cam plate 30. The retaining clip 32 cannot "pop off" or be inadvertently released from the drive shaft 26 because its movement is limited by the second abutment 67b of the cam plate pocket 67.

The drive shaft groove 46 can be relocated to different positions to obtain a different pretension on the spring member 28. The pretensions allow different torque trips, that is, torque limits. The illustrated detents and grooves 52, 72 allow for a wide range of working motion and pretension. This range can be, for example, from a free/loose spring member 28 to a spring member 28 with about 0.20 mm of pretension. It should also be appreciated that different torque trips can be achieved with the same spring member and cam plate 28, 30. This results in the ability to tightly control the torque and tension of all tire carrier assemblies 10 to their intended performance specification ranges while using common components.

The clutch 20 is assembled into the tire carrier assembly 10 by operably connecting the eccentric cam 68 and the plurality of cam surfaces 70 of the cam plate 30 to the lift drum 22 so that rotational motion or torque of the cam plate 30 is transferred to the lift drum 22 to rotate the lift drum 22. The drive shaft 26 is operatively connected to a torque input device 18 so that rotational motion or torque of the torque input device 18 is selectively transferred to the drive shaft 26 to rotate the drive shaft 26 and the spring member 28. The torque input device 18 can be either a manual device such as, for example, a handle or tool attachment so that a user can manually rotate the drive shaft 26 or a powered device such as, for example, an electric motor that selectively rotates the drive shaft 26.

In operation, when the tire carrier 12 is in its lower position and rotational motion or torque is applied by the torque input device 18 to rotate the drive shaft 26, the drive shaft 26 rotates the spring member 28 which in turn rotates the cam plate 30 through the engagement of the detents 52 with the grooves 72. The rotation of the cam plate 30 in turn rotates the lift drum 22 to wind the cable 24 onto the lift drum 22 and lift the tire carrier 12 with the spare tire 14 thereon. When the tire carrier 12 reaches its upper position and tension in the cable 24 increases so that the predetermined torque limit of the clutch 20 is reached, the detents 52 of the spring member 28 resiliently deflect out of engagement with the grooves 72 of the cam plate 30 so that torque is not transmitted from the spring member 28 to the cam plate 30. Thus, the cam plate 30 and the lift drum 22 stop rotating even though rotation of the drive shaft 26 and the spring member 28 may continue to avoid undesirable tension in the cable 24.

It is apparent from the above detailed description of the present invention, that the illustrated clutch 20 provides positive retention of the retaining clip 32. This avoids failure of the clutch 20 due to inadvertent release of the spring clip 32 from the drive shaft.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A spare tire carrier comprising, in combination:
   a drive shaft having a central rotational axis and a groove;
   a disk-shaped spring member secured to the drive shaft for rotation with the drive shaft about the central rotational axis;
   wherein the spring member has a plurality of axially extending detents formed at an outer edge of the spring member;
   a plate adjacent the spring member and rotatable about the drive shaft;
   wherein the plate has a plurality of grooves receiving the detents of the spring member;
   a retaining clip located within the groove of the drive shaft;
   wherein the drive shaft has an axially-facing abutment spaced apart and facing the groove and the plate and the spring member are located between the retaining clip and the axially-facing abutment with the spring member engaging the axially-facing abutment and the plate engaging the retaining clip to retain the plate in a longitudinal position relative to the spring member to obtain a predetermined pretension of the spring member;
   wherein engagement of the detents with the grooves causes rotation of the plate upon rotation of the drive shaft and the spring member when below a predetermined torque limit and deflection of the detents out of the grooves prevents rotation of the plate upon rotation of the drive shaft and the spring member when above the predetermine torque;
   a radial-facing abutment located outward of the retaining clip to prevent release of the retaining clip from the groove;
   a lift drum operatively connected to the cam plate for rotation therewith;
   an elongate flexible member which is wound onto and unwound off of the lift drum upon rotation of the lift drum; and
   rotational motion input device operatively connected to the drive shaft.

2. The spare tire carrier according to claim 1, wherein the radial-facing abutment is formed by a pocket in the plate.

3. The spare tire carrier according to claim 2, wherein the pocket is formed by a counter bore in the plate.

4. The spare tire carrier according to claim 3, wherein the counter bore is circular.

5. The spare tire carrier according to claim 2, wherein the pocket is circular.

6. The spare tire carrier according to claim 2, wherein the pocket also forms an axial-facing abutment engaging the retaining clip.

7. The spare tire carrier according to claim 1, wherein the radial-facing abutment is cylindrically-shaped.

8. The spare tire carrier according to claim 1, wherein the radial-facing abutment encircles the retaining clip.

9. The spare tire carrier according to claim 8, wherein the radial-facing abutment is continuous about the retaining clip.

10. The spare tire carrier according to claim 1, wherein the retaining clip is an E-ring.

11. A spare tire carrier comprising, in combination:
    a drive shaft having a central rotational axis and a groove;
    a disk-shaped spring member secured to the drive shaft for rotation with the drive shaft about the central rotational axis;
    wherein the spring member has a plurality of axially extending detents formed at an outer edge of the spring member;
    a plate adjacent the spring member and rotatable about the drive shaft;
    wherein the plate has a plurality of grooves receiving the detents of the spring member;
    a retaining clip located within the groove of the drive shaft;
    wherein the drive shaft has an axially-facing abutment spaced apart and facing the groove and the plate and the spring member are located between the retaining clip and the axially-facing abutment with the spring member engaging the axially-facing abutment and the plate engaging the retaining clip to retain the plate in a longitudinal position relative to the spring member to obtain a predetermined pretension of the spring member;
    wherein engagement of the detents with the grooves causes rotation of the plate upon rotation of the drive shaft and the spring member when below a predetermined torque limit and deflection of the detents out of the grooves prevents rotation of the plate upon rotation of the drive shaft and the spring member when above the predetermine torque;
    wherein the plate has a pocket forming a radial-facing abutment located outward of the retaining clip to prevent release of the retaining clip from the groove;
    a lift drum operatively connected to the cam plate for rotation therewith;
    an elongate flexible member which is wound onto and unwound off of the lift drum upon rotation of the lift drum; and
    rotational motion input device operatively connected to the drive shaft.

12. The spare tire carrier according to claim 11, wherein the pocket is formed by a counter bore in the plate.

13. The spare tire carrier according to claim 12, wherein the counter bore is circular.

14. The spare tire carrier according to claim 11, wherein the pocket is circular.

15. The spare tire carrier according to claim 11, wherein the radial-facing abutment is cylindrically-shaped.

16. The spare tire carrier according to claim 11, wherein the radial-facing abutment encircles the retaining clip.

17. The spare tire carrier according to claim 16, wherein the radial-facing abutment is continuous about the retaining clip.

18. The spare tire carrier according to claim 11, wherein the pocket forms an axial-facing abutment engaging the retaining clip.

19. The spare tire carrier according to claim 11, wherein the retaining clip is an E-ring.

20. A spare tire carrier comprising, in combination:
    a drive shaft having a central rotational axis and a groove;
    a disk-shaped spring member secured to the drive shaft for rotation with the drive shaft about the central rotational axis;
    wherein the spring member has a plurality of axially extending detents formed at an outer edge of the spring member;
    a plate adjacent the spring member and rotatable about the drive shaft;
    wherein the plate has a plurality of grooves receiving the detents of the spring member;
    a retaining clip located within the groove of the drive shaft;
    wherein the drive shaft has an axially-facing abutment spaced apart and facing the groove and the plate and the spring member are located between the retaining clip and the axially-facing abutment with the spring member engaging the axially-facing abutment and the plate engaging the retaining clip to retain the plate in a longitudinal position relative to the spring member to obtain a predetermined pretension of the spring member;
    wherein engagement of the detents with the grooves causes rotation of the plate upon rotation of the drive shaft and the spring member when below a predetermined torque limit and deflection of the detents out of the grooves prevents rotation of the plate upon rotation of the drive shaft and the spring member when above the predetermine torque;
    wherein the plate has a pocket forming an axial-facing abutment engaging the retaining clip and a radial-facing abutment located outward of the retaining clip to prevent release of the retaining clip from the groove;
    a lift drum operatively connected to the cam plate for rotation therewith;
    an elongate flexible member which is wound onto and unwound off of the lift drum upon rotation of the lift drum; and
    rotational motion input device operatively connected to the drive shaft.

* * * * *